Oct. 23, 1956  C. MADDOX  2,768,255
FEELER SWITCH
Filed Sept. 10, 1954  2 Sheets-Sheet 1

INVENTOR
Caroll Maddox
BY Gustav Miller
ATTORNEY

Oct. 23, 1956
C. MADDOX
2,768,255
FEELER SWITCH
Filed Sept. 10, 1954
2 Sheets-Sheet 2
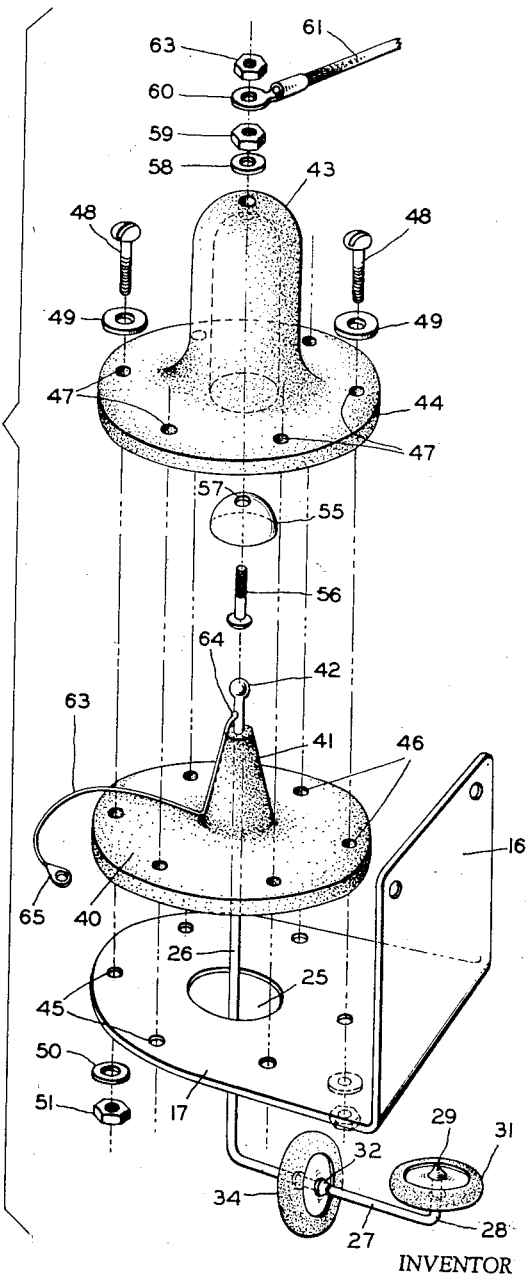
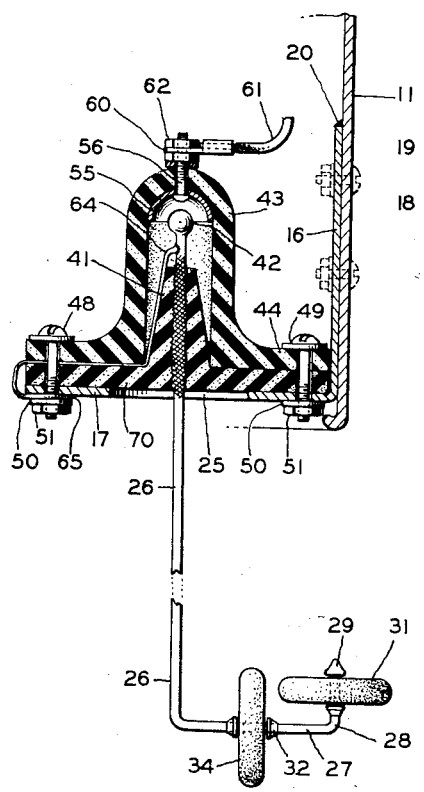
INVENTOR
Caroll Maddox
BY *Justave Miller*
ATTORNEY

United States Patent Office 2,768,255
Patented Oct. 23, 1956

2,768,255

FEELER SWITCH

Caroll Maddox, Mills, Wyo.

Application September 10, 1954, Serial No. 455,221

1 Claim. (Cl. 200—61.44)

This invention relates to a feeler switch and a feeler therefor, particularly adapted for use with a motor vehicle, and having as its primary object a means for actuating an audible or visual signal upon the approach of the vehicle to a predetermined distance from a curb or the like.

An additional object of the invention is the provision of an improved feeler arm, which through abutment with a curb or the like, will actuate a signal or indicator to inform the driver of the vehicle of this condition.

A secondary object of the invention is the provision of means in association with the aforesaid feeler arm for indicating a diminished tire pressure.

A still further object of the invention is the provision of an improved switch mechanism which will activate the indicator or signal means upon movement of the feeler arm in any direction.

Still other objects reside in the combination of elements, arrangement of parts, and features of construction, all as will be pointed out hereinafter.

Other objects will in part be obvious and in part be pointed out hereinafter and shown in the accompanying drawings wherein there is disclosed a preferred embodiment of this inventive concept.

In the drawings:

Figure 3 is an exploded perspective view of one feeler arm and the switch associated therewith, and Figure 4 is a vertical cross sectional view of the switch mechanism.

Similar reference characters refer to similar parts throughout the several views of the drawings.

Figure 1:
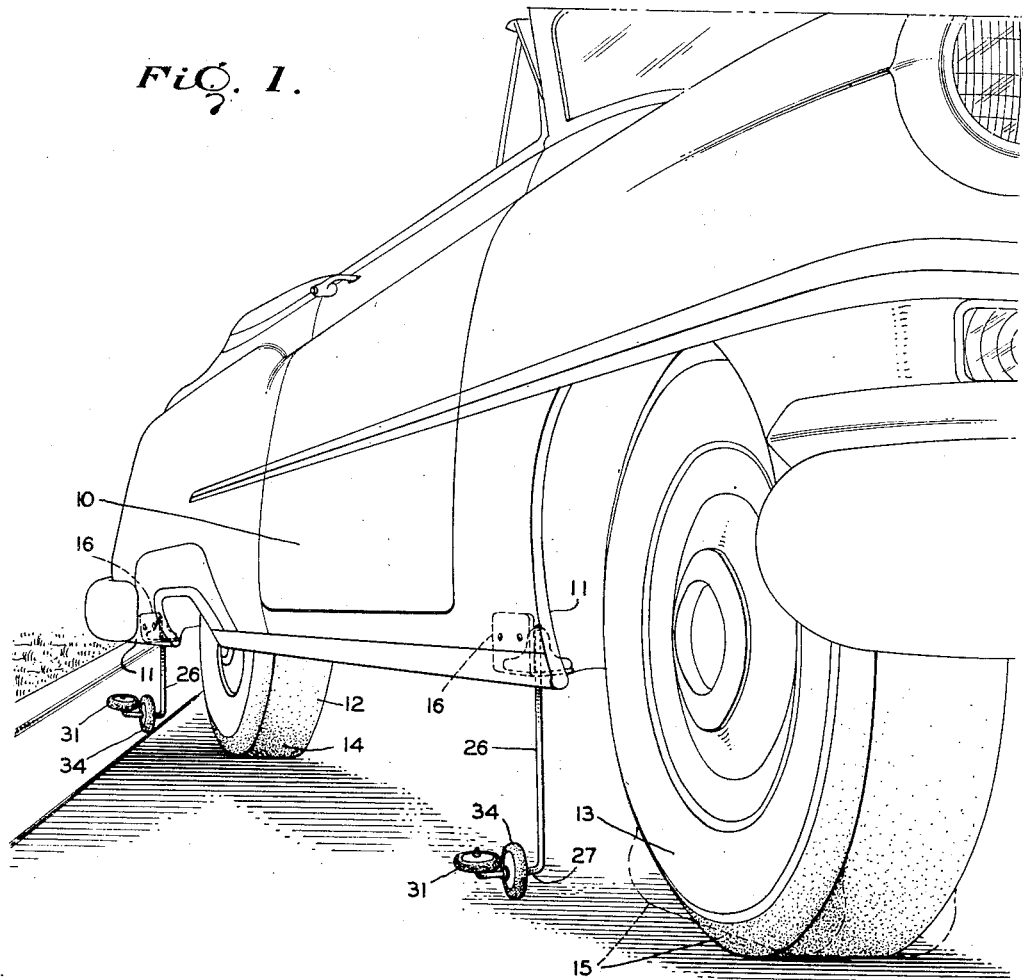
Figure 1 is a perspective view of a motor vehicle having a pair of feeler switch arms, the one associated with the rear wheel being shown in position to indicate juxtaposition to a curb, and the one associated with the front wheel being operative to disclose a deflated tire condition.

Having reference now to drawings in detail, there is generally indicated at 10 a motor vehicle including a side skirt 11 and front and rear wheels 12 and 13, respectively, the wheels being provided with conventional tires 14 and 15 respectively.

Positioned inside of skirt 11 adjacent each of the four wheels is an L-shaped bracket including an upright arm 16, and a horizontal arm 17, the arm 16 being preferably secured interiorly of the skirt 11 by means of screws 18 and nuts 19, although alternatively welding, as indicated at 20, may be employed. The horizontal arm 17 is provided with a central aperture 25 through which extends a vertical feeler rod 26, the feeler rod having a horizontal portion 27 and a second upwardly extending vertical portion 28, the latter being surmounted by a conical stop member 29. A second stop member 30 serves to limit the movement of a horizontally disposed wheel or roller 31 positioned on vertical portion 25.

Horizontal section 27 is also provided with a pair of stop members 32 and 33 respectively between which is mounted a vertically positioned wheel or roller 34. Vertically positioned rollers 34 are adapted for abutment or engagement with the paving upon decrease in tire pressure, while horizontally positioned wheels 31 are adapted to engage a curb or other obstruction as the vehicle approaches the same. Such engagement will occasion the actuation of an indicator in a manner more fully described hereinafter.

Mounted on horizontal flange 17 is a base 40 comprised of insulating material and including an upright conical section 41, having a centrally disposed bore through which the upper extremity of feeler shaft 26 extends, the shaft 26 terminating in a contact button 42, which is preferably spherical in configuration. Surrounding conical protuberance 41 is a dome shaped member 43, which includes a flange 44, also of insulating material.

Registering bolt holes 45, 46 and 47 in flange 17, base 40 and flange 44 respectively are adapted for the reception of bolts 48, while washers 49 and 50 at the opposite sides of the assembly are adapted to be secured in position by nuts 51 to retain the base 40 and flange 44 in related assembly on flange 17.

Interiorly positioned within the top of dome 43 is a hemispherical hollow contact member 55. The hemispherical contact 55 normally surrounds contact 42 so that tilting of the rod 26 in any direction will close a circuit, to be more fully described hereinafter, between contacts 42 and 55. Contact 55 may be held in position by means of a screw 56 extending through a suitable aperture 57 therein, and through a washer 58 and a lock nut 59, and engaging the terminal 60 of a wire 61, the terminal 60 being held in position by means of a second lock nut 62. Alternatively the hemispherical contact member 55 may be molded integrally with the dome shape member 43, and provided with any suitable electrical contact.

A ground wire 63 is suitably soldered or otherwise secured to shaft 26 as indicated at 64, and extends to a terminal 65 which is suitably grounded, in any desired manner, as to one of bolts 48.

From the foregoing, the operation of the portion of the device hereinafter shown and described should now be readily apparent. Upon tilting of the shaft 26 in any direction upon the impact of either rollers 31 or 34, the contact 42 will engage the contact 55, to close a circuit, as will be more fully described hereinafter, to actuate an indicator within the vehicle. For example, when the tire assumes the position shown in dotted lines in Figure 1, the roller 34 will contact the pavement, thus causing a tilting of the rod 26. The circuit will then be closed and the indicator actuated. Correspondingly, when any one of the rollers 31 contacts a curb or other obstruction similar, tilting of rod 26 will occasion movement of contact 42 into engagement with hemispherical contact 55. It is to be pointed out that the body 43 is preferably comprised of relatively non-resilient and inflexible insulating material while the base 40 and its associated cone 41 are preferably of relatively highly flexible insulating material in order to insure the return of the contact to open position upon release of pressure upon any one of the associated rollers. It should also be pointed out that feeler shaft 26 is grasped by the bore of cone 41 with a sufficiently tight frictional grip to preclude rotation of the shaft therein in such manner as to disalign the horizontal portion 27 of the feeler shaft from its appropriate position at right angles to the longitudinal axis of the vehicle.

Figure 2:
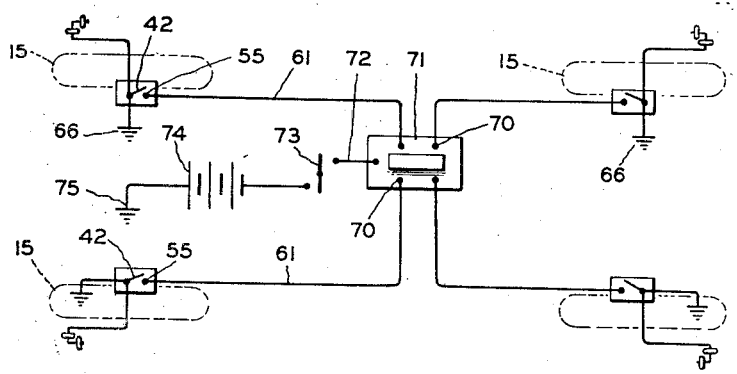
Figure 2 is a schematic wiring diagram disclosing a circuit for four feeler switches, one associated with each vehicle wheel.

Having reference now to Figure 2, it will be seen that each wire 61 leading from its associated contact 55 extends to an appropriate terminal 70 associated with a signaling device or indicator 71 positioned interiorly of the vehicle and preferably on the dashboard. A wire 72 extends in circuit from the signaling device or indicator 71 through the ignition switch 73 and thence through the battery 74 to a ground 75.

Signaling device 71 may take any desired form, such as an audible signal compirsed of a bell, chimes, a buzzer or the like, or a visual signal such as an intermittent or steady light, a swinging arm, or any other desired audible or visual indicating means.

Now, from the foregoing, it will be readily apparent that there is herein provided an improved feeler switch and feeler arm therefor, together with indicating means which will readily disclose, not only the position of the vehicle relative to the curb or other obstruction, but will also indicate low tire pressure in any one of the tires associated with the vehicle.

Obviously the location of the feeler rods is dependent upon the use to which the vehicle is put, and may be employed on trucks or trailers as a back-up signal to warn the driver when the truck approaches a loading platform or the like.

From the foregoing, it is apparent that there is herein provided an improved switch and a signaling device which accomplishes all of the objects of this invention, and others including many advantages of great practical utility and commercial importance.

As many embodiments may be made of this inventive concept, and as many modifications may be made of the embodiment hereinbefore shown and described, it is to be understood that all matter herein is to be interpreted merely as illustrative, and not in a limiting sense.

I claim:

In a feeler switch for vehicles the combination of a supporting bracket, a flexible insulating base having a conical protuberance carried thereby, a dome shaped body spaced from said protuberance, having an internally positioned hollow hemispherical contact, surrounding said conical protuberance, a feeler shaft extending through said protuberance, and a contact on the end of said shaft engageable with said hemispherical contact upon tilting of said shaft in any direction, said feeler shaft comprising a vertical portion extending through said protuberance and a horizontal portion exteriorly of said protuberance and extending outwardly of said vehicle, a second upwardly extending vertical portion, a horizontally disposed roller on said second vertical portion and a vertically disposed roller on said horizontal portion.

References Cited in the file of this patent

UNITED STATES PATENTS

| | | |
|---|---|---|
| 2,091,101 | Moss | Aug. 24, 1937 |
| 2,258,334 | Miller | Oct. 7, 1941 |
| 2,440,587 | Krall | Apr. 27, 1948 |
| 2,592,742 | Rose | Apr. 15, 1952 |